(No Model.)
H. F. GRAETZEL & F. N. POWELL.
HARROW.
No. 387,412. Patented Aug. 7, 1888.
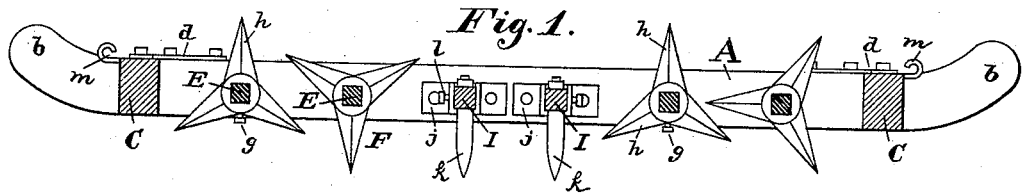
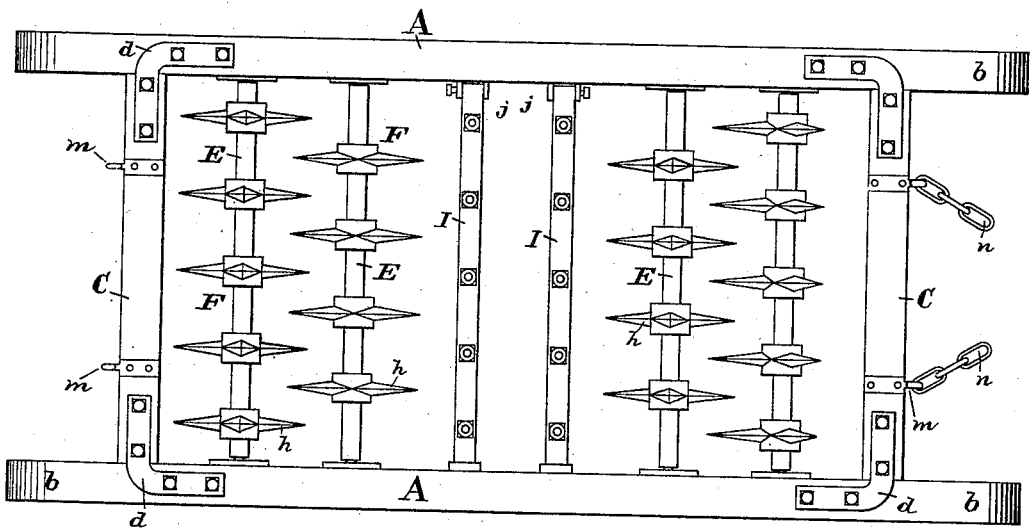
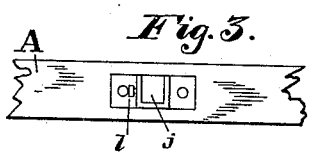
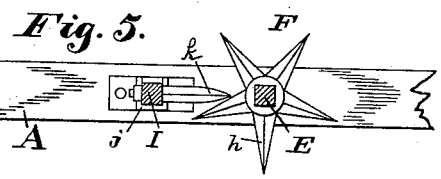
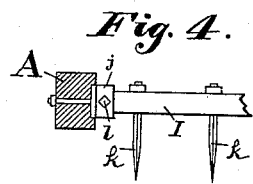
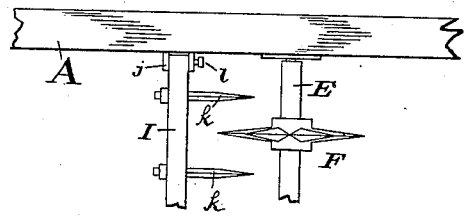
WITNESSES:
R. L. Clemmitt.
John E. Morris.
INVENTORS:
Henry F. Graetzel
Fredrick N. Powell
BY Chas B. Mann
ATTORNEY.

United States Patent Office.

HENRY F. GRAETZEL AND FREDRICK N. POWELL, OF FULLERTON, MARYLAND.

HARROW.

SPECIFICATION forming part of Letters Patent No. 387,412, dated August 7, 1888.

Application filed May 21, 1888. Serial No. 274,505. (No model.)

*To all whom it may concern:*

Be it known that we, HENRY F. GRAETZEL and FREDRICK N. POWELL, citizens of the United States, residing at Fullerton, in the county of Baltimore and State of Maryland, have invented certain new and useful Improvements in Harrows, of which the following is a specification.

This invention relates to a harrow for pulverizing the soil, and is illustrated in the accompanying drawings, in which—

Figure 1 is a longitudinal section. Fig. 2 is a top view. Fig. 3 shows a bearing for the cross-bar. Fig. 4 shows a cross-bar seated in its bearing. Figs. 5 and 6 show the cross-bars placed with their prongs in another position.

The frame of the harrow consists of two side beams, A, whose ends $b$ curve upward, sled-runner fashion. These side beams are connected by end bars, C, and at the corners of the frame angle-plates $d$ lap over the beams and bars, and are bolted thereto and serve to make the frame rigid.

Revoluble shafts E have their ends journaled in bearings in the side beams, and are provided with pronged wheels F. What are here termed "pronged wheels" comprise a hub fitting on the shaft E, and held thereto by a set-screw, $g$, said hub having tapering prongs $h$ radially projecting from it. It is immaterial how the pronged wheels are made. They may have three, four, or five prongs. The prongs $h$ might be fastened directly to the shaft instead of to the hub, as in either case when the harrow is drawn over the ground the shaft revolves and the prongs turn and pierce the clods and break them up. It will be observed a revoluble shaft is at each end of the shaft.

The harrow has cross-bars I, extending from one side beam to the other and seated in bearings $j$, which hold them rigid. These cross-bars are provided with teeth $k$, which may project down, as shown in Figs. 1 and 2, and serve to rake up the soil, turn and also break the clods, and to level the surface. The cross-bars I have position between the revoluble shafts. Two revoluble shafts, E, and two rigid cross-bars, I, may adjoin each other, or a single rigid cross-bar may be between each two revoluble shafts in either case, thereby to subject the soil to the alternate action of the revolving prongs $h$ and rigid drag-teeth $k$. The cross-bars may be confined in their bearings by set-screws $l$, or in any other way.

The cross-bars I may be adjusted in their bearings $j$, so that the teeth $k$ will project sidewise, as shown in Figs. 5 and 6, and intermesh with the prongs $h$ of the revolving shafts, thereby serving to clear the said revolving prongs of roots, grass, or trash. The bearings $j$, while holding the cross-bars rigidly in either position, permit of the bars being changed from one position to the other.

Each end of the harrow has hooks $m$, to which a draft-chain, $n$, may be attached, and the team— one or two animals—harnessed to said chain. The harrow may thus be drawn either end first.

It is obvious that a seat for the driver may be supported above the harrow by suitable standards.

Having described our invention, we claim—

In a harrow, the combination, with the side beams, A, having upwardly-turned ends $b$ and angular bearings $j$, and the revolving shaft E, having a series of prongs, $h$, of the bars I, with teeth $k$ and adjustably mounted in the bearings $j$, whereby the said teeth $k$ are adapted to be placed in a horizontal position projecting between the prongs $h$, or in a vertical position in contact with the ground, as set forth.

In testimony whereof we affix our signatures in the presence of two witnesses.

HENRY F. GRAETZEL.
FREDRICK N. POWELL.

Witnesses:
JOHN E. MORRIS,
JNO. T. MADDOX.